US011564452B2

(12) United States Patent
Kobayashi

(10) Patent No.: US 11,564,452 B2
(45) Date of Patent: Jan. 31, 2023

(54) WINDING DEVICE

(71) Applicant: ADAMANT NAMIKI PRECISION JEWEL CO., LTD., Tokyo (JP)

(72) Inventor: Yasuyuki Kobayashi, Kuroishi (JP)

(73) Assignee: ADAMANT NAMIKI PRECISION JEWEL CO., LTD., Tokyo (JP)

( * ) Notice: Subject to any disclaimer, the term of this patent is extended or adjusted under 35 U.S.C. 154(b) by 882 days.

(21) Appl. No.: 16/467,831

(22) PCT Filed: Dec. 1, 2017

(86) PCT No.: PCT/JP2017/043224
§ 371 (c)(1),
(2) Date: Jun. 7, 2019

(87) PCT Pub. No.: WO2018/105504
PCT Pub. Date: Jun. 14, 2018

(65) Prior Publication Data
US 2019/0335859 A1    Nov. 7, 2019

(30) Foreign Application Priority Data

Dec. 9, 2016   (JP) .............................. JP2016-239516

(51) Int. Cl.
*A43C 11/16* (2006.01)
*B65H 75/44* (2006.01)
(Continued)

(52) U.S. Cl.
CPC .............. *A43C 11/165* (2013.01); *A43C 7/00* (2013.01); *B65H 18/08* (2013.01); *B65H 18/10* (2013.01);
(Continued)

(58) Field of Classification Search
CPC ......... A43C 11/16; A43C 11/165; A43C 1/00; A43C 7/00; A43C 7/08; A43B 3/34;
(Continued)

(56) References Cited

U.S. PATENT DOCUMENTS 4,787,124 A * 11/1988 Pozzobon ............ A43C 11/165
36/50.5
4,809,656 A    3/1989 Suzuki
(Continued)

FOREIGN PATENT DOCUMENTS

JP    S48-90882 A    11/1973
JP    H03-262432 A   11/1991
(Continued)

OTHER PUBLICATIONS

International Search Report issued in PCT/JP2017/043224; dated Feb. 27, 2018.

*Primary Examiner* — Michael R Mansen
*Assistant Examiner* — Raveen J Dias
(74) *Attorney, Agent, or Firm* — Studebaker & Brackett PC

(57) ABSTRACT

Provided is a winding device configured so that the entirety of the device can be thinned and looseness of an elongated member can be reduced. In a winding device 1A, a flat motor 2 is used as a motor, and a spool 3 and a magical planetary gear mechanism 4 are formed flat along an extending XY plane of the flat motor 2. Thus, the entirety of the device can be configured flat, and can be thinned. Moreover, the magical planetary gear mechanism 4 prevents rotation of the spool 3 by external force, and therefore, looseness of the elongated member can be reduced.

2 Claims, 6 Drawing Sheets

(51) Int. Cl.
*A43C 7/00* (2006.01)
*B65H 75/30* (2006.01)
*B65H 18/08* (2006.01)
*B65H 18/10* (2006.01)
*B65H 75/34* (2006.01)
*B65H 75/00* (2006.01)
*A43C 7/08* (2006.01)
*H02K 7/116* (2006.01)
*B65H 59/00* (2006.01)

(52) U.S. Cl.
CPC .......... *B65H 75/30* (2013.01); *B65H 75/34* (2013.01); *B65H 75/4481* (2013.01); *B65H 75/4486* (2013.01); *H02K 7/116* (2013.01); *A43C 7/08* (2013.01); *B65H 59/00* (2013.01); *B65H 75/00* (2013.01); *B65H 75/4471* (2013.01); *B65H 2403/40* (2013.01); *B65H 2701/39* (2013.01)

(58) Field of Classification Search
CPC .......... A43B 3/38; B65H 18/00; B65H 18/02; B65H 18/08; B65H 18/085; B65H 18/10; B65H 54/00; B65H 54/02; B65H 59/00; B65H 75/00; B65H 75/285; B65H 75/30; B65H 75/34; B65H 75/362; B65H 75/4418; B65H 75/4428; B65H 75/4481; B65H 75/4486; B65H 2403/40; B65H 2701/39; H02K 7/116; H02K 7/118
See application file for complete search history.

(56) References Cited

U.S. PATENT DOCUMENTS

| | | | | |
|---|---|---|---|---|
| 5,934,599 | A * | 8/1999 | Hammerslag | A43C 11/00 242/396.2 |
| 6,202,953 | B1 * | 3/2001 | Hammerslag | A43C 11/00 242/396.2 |
| 6,289,558 | B1 | 9/2001 | Hammerslag | |
| 6,437,470 | B1 * | 8/2002 | Hsu | H02K 7/116 310/83 |
| 8,381,362 | B2 | 2/2013 | Hammerslag et al. | |
| 9,365,387 | B2 * | 6/2016 | Beers | A61F 5/028 |
| 9,578,926 | B2 * | 2/2017 | Alt | A43C 11/165 |
| 9,693,605 | B2 * | 7/2017 | Beers | B65H 69/00 |
| 10,046,942 | B2 * | 8/2018 | Beers | A43C 11/008 |
| 10,405,609 | B2 * | 9/2019 | Orand | A43C 11/008 |
| 11,209,070 | B2 * | 12/2021 | Orand | A43C 11/008 |
| 2002/0095750 | A1 * | 7/2002 | Hammerslag | A43B 5/16 24/68 SK |
| 2003/0204938 | A1 * | 11/2003 | Hammerslag | A43C 11/004 24/68 SK |
| 2003/0222532 | A1 * | 12/2003 | Hsu | F16H 57/033 310/68 R |
| 2005/0081339 | A1 * | 4/2005 | Sakabayashi | A43C 11/165 24/128 |
| 2014/0068838 | A1 * | 3/2014 | Beers | A43C 1/00 2/243.1 |
| 2014/0070042 | A1 * | 3/2014 | Beers | B65H 59/384 242/413 |
| 2014/0082963 | A1 * | 3/2014 | Beers | A43B 3/38 36/83 |
| 2015/0250268 | A1 * | 9/2015 | Alt | A43C 11/165 24/68 SK |
| 2016/0272458 | A1 * | 9/2016 | Beers | A43C 11/165 |
| 2016/0337740 | A1 * | 11/2016 | Chu | B65H 75/4481 |
| 2017/0265573 | A1 * | 9/2017 | Beers | A43C 11/008 |
| 2017/0265574 | A1 * | 9/2017 | Beers | A43B 3/34 |
| 2017/0265576 | A1 * | 9/2017 | Beers | A43B 11/00 |
| 2017/0265581 | A1 * | 9/2017 | Chang | A43B 1/0072 |
| 2017/0265585 | A1 * | 9/2017 | Orand | A43C 11/165 |
| 2017/0265586 | A1 * | 9/2017 | Schneider | H02K 26/00 |
| 2017/0265593 | A1 * | 9/2017 | Schneider | A43B 3/38 |
| 2017/0267485 | A1 * | 9/2017 | Schneider | A43C 11/165 |
| 2017/0271947 | A1 * | 9/2017 | Ando | F16D 65/18 |
| 2017/0272008 | A1 * | 9/2017 | Schneider | H02P 6/06 |
| 2017/0295889 | A1 * | 10/2017 | Beers | A43C 11/165 |
| 2018/0125168 | A1 * | 5/2018 | Beers | A43C 1/00 |
| 2018/0153263 | A1 * | 6/2018 | Beers | A43B 3/34 |
| 2018/0317609 | A1 * | 11/2018 | Beers | A43B 3/38 |
| 2018/0343978 | A1 * | 12/2018 | Stillman | B65H 75/4428 |
| 2019/0223557 | A1 * | 7/2019 | Orand | A43B 3/34 |
| 2019/0246746 | A1 * | 8/2019 | Bock | A43B 3/34 |
| 2019/0246747 | A1 * | 8/2019 | Bock | A43C 11/165 |
| 2019/0328085 | A1 * | 10/2019 | Bock | A43B 3/34 |
| 2020/0281318 | A1 * | 9/2020 | Beers | A43B 3/34 |
| 2021/0245991 | A1 * | 8/2021 | Johnson | B65H 75/4492 |
| 2021/0251343 | A1 * | 8/2021 | Martin | F16H 3/70 |
| 2022/0110414 | A1 * | 4/2022 | Sekii | A43C 1/00 |

FOREIGN PATENT DOCUMENTS

| | | |
|---|---|---|
| JP | 2003-508097 A | 3/2003 |
| JP | 2004-222782 A | 8/2004 |
| JP | 2008-525052 A | 7/2008 |
| JP | 2015-177558 A | 10/2015 |
| JP | 2016-86657 A | 5/2016 |
| JP | 2016-530058 A | 9/2016 |

* cited by examiner

WINDING DEVICE

TECHNICAL FIELD

The present invention relates to a winding device configured to wind up an elongated member.

BACKGROUND ART

Generally, a winding device has been known, which is configured to rotate a reel-shaped winding member by a motor to wind up a strap-shaped or band-shaped elongated member. A device provided at a shoe to tighten a shoe strap by winding of a cord has been proposed as such a winding device (see, e.g., Patent Document 1). The winding device described in Patent Document 1 includes a winding ring, a motor, and a deceleration member, and is embedded in a sole of the shoe.

CITATION LIST

Patent Literature

Patent Document 1: JP-A-2004-222782

SUMMARY OF THE INVENTION

Problems to be Solved by the Invention

In a case where the winding device is housed in the sole of the shoe as described in Patent Document 1, it is easy to ensure the dimensions of a housing in an in-plane direction of the sole, but it is difficult to ensure the dimensions of the housing in a direction perpendicular to a plane. Moreover, there are limitations on the thickness of the sole due to use and design of the shoe, and for this reason, the winding device cannot be provided in some cases. For these reasons, thickness reduction in the winding device has been demanded.

However, in the winding device described in Patent Document 1, an axial direction of the motor is directed to the in-plane direction of the sole. Thus, in a case where an attempt is made to reduce the thickness of the entirety of the device, the diameter of the motor needs to be decreased, and therefore, the output of the motor is lowered.

Even when a power supply to the motor is stopped after winding of the cord, looseness of the shoe strap needs to be prevented. In the winding device described in Patent Document 1, an axial direction of the winding ring and the axial direction of the motor are perpendicular to each other, and drive force is transmitted through the deceleration member. Thus, rotation is less likely to occur even by application of external force to the winding ring. Thus, when the axial direction of the motor is changed for reducing the thickness of the entirety of the device, there is a probability that the function of preventing rotation is lost.

As described above, it is difficult to realize both of thickness reduction in the winding device and reduction in looseness of the elongated member. Moreover, even in a case where the winding device configured to wind up the elongated member is provided at other portions than the shoe, both of thickness reduction in the winding device and reduction in looseness of the elongated member are demanded in some cases.

An object of the present invention is to provide a winding device configured so that the entirety of the device can be thinned and looseness of an elongated member can be reduced.

Solution to the Problems

The winding device of the present invention is a winding device for winding up an elongated member. The winding device includes a flat motor placed flat along a predetermined plane, a winding member configured to rotate in a forward direction to wind up the elongated member, a deceleration mechanism provided between the flat motor and the winding member, and a backstop mechanism configured to restrict rotation of the winding member at least in a backward direction by external force. The winding member and the deceleration mechanism are formed flat along the predetermined plane, and have rotary shafts provided coaxially with an output shaft of the flat motor or provided in parallel at different positions.

According to the present invention described above, the flat motor is used as a motor, and the winding member and the deceleration mechanism are formed flat along the predetermined plane as in the flat motor. Thus, the entirety of the device can be configured flat, and can be thinned. Moreover, the backstop mechanism configured to restrict rotation of the winding member at least in the backward direction by external force is provided so that looseness of the elongated member can be reduced even when the winding member and the flat motor have the rotary shafts provided coaxially or in parallel with each other.

In this case, in the winding device of the present invention, the deceleration mechanism is preferably a planetary gear mechanism having a sun gear, a planetary gear, a fixed internal gear, and an output internal gear, and preferably functions as the backstop mechanism. According to such a configuration, the planetary gear mechanism also functioning as the backstop mechanism is used as the deceleration mechanism, and therefore, the entirety of the device can be simplified as compared to a configuration in which a deceleration mechanism and a backstop mechanism are separately provided. Note that a mechanism configured such that the number of teeth is different between a fixed internal gear and an output internal gear (a so-called magical planetary gear mechanism) or a mechanism configured such that the number of teeth is different between a planetary gear portion engaging with a fixed internal gear and a planetary gear portion engaging with an output internal gear may be used as the planetary gear mechanism. Moreover, the planetary gear mechanism can restrict rotation not only in the backward direction but also in the forward direction, and can also reduce extreme tightening of the elongated member in a case where an attempt is made to rotate the winding member by external force.

Moreover, in the winding device of the present invention, the flat motor preferably has, between the output shaft and each of a tooth and a magnet, a housing configured to house the planetary gear, the fixed internal gear, and the output internal gear, and the sun gear is preferably provided at the output shaft. According to such a configuration, the sun gear, the planetary gear, the fixed internal gear, and the output internal gear of the planetary gear mechanism are housed in the housing of the flat motor. Thus, in the case of increasing a coil and the magnet of the flat motor in diameter to realize higher output, a space between the output shaft and each of the coil and the magnet is effectively utilized so that space saving can be realized. Moreover, the sun gear is arranged coaxially with the output shaft of the flat motor, and therefore, the configuration can be simplified without the need for providing a transmission member configured to transmit drive force from the flat motor to the planetary gear mechanism.

Further, in the winding device of the present invention, the backstop mechanism may be formed flat along the predetermined plane, and a rotary shaft thereof may be provided coaxially with the rotary shaft of the winding member. The rotary shaft of the winding member and the rotary shaft of the backstop mechanism may extend in parallel at positions different from that of the output shaft. According to such a configuration, use of the flat backstop mechanism can lead to thickness reduction in the entirety of the device. Moreover, the rotary shafts of the winding member and the backstop mechanism extend in parallel at the positions different from that of the output shaft of the flat motor, and therefore, the flat motor, the winding member, and the backstop member can be arranged along the predetermined plane. Thus, the entirety of the device can be thinned as compared to a configuration in which these components are all arranged coaxially.

Effects of the Invention

According to the winding device of the present invention, the flat motor is used as the motor, the winding member and the deceleration mechanism are formed flat, and the backstop mechanism is provided. Thus, the entirety of the device can be thinned, and looseness of the elongated member can be reduced.

DESCRIPTION OF THE EMBODIMENTS

Figure 1:
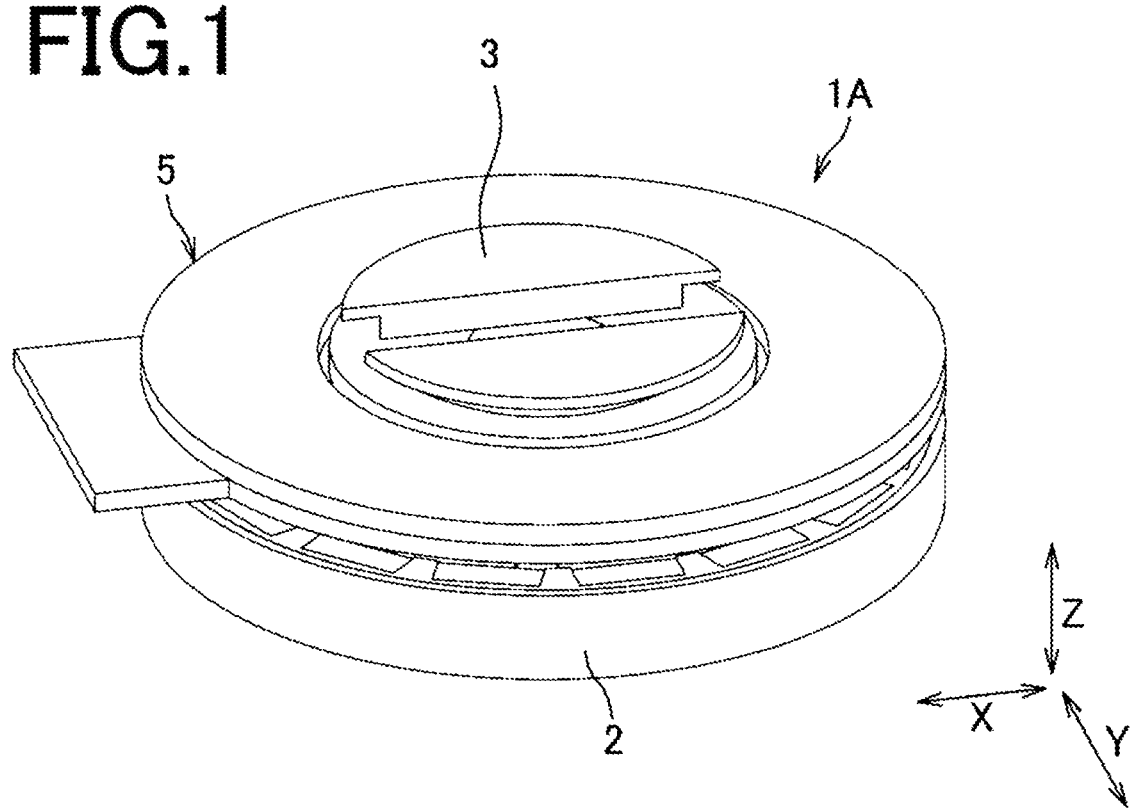
FIG. 1 is a perspective view of a winding device according to a first embodiment of the present invention.

Hereinafter, each embodiment of the present invention will be described with reference to the drawings. Note that in a second embodiment, the same reference numerals as those of a first embodiment are used to represent the same components as those described in the first embodiment and components having functions similar to those described in the first embodiment, and description thereof will be omitted.

First Embodiment

Figure 2:
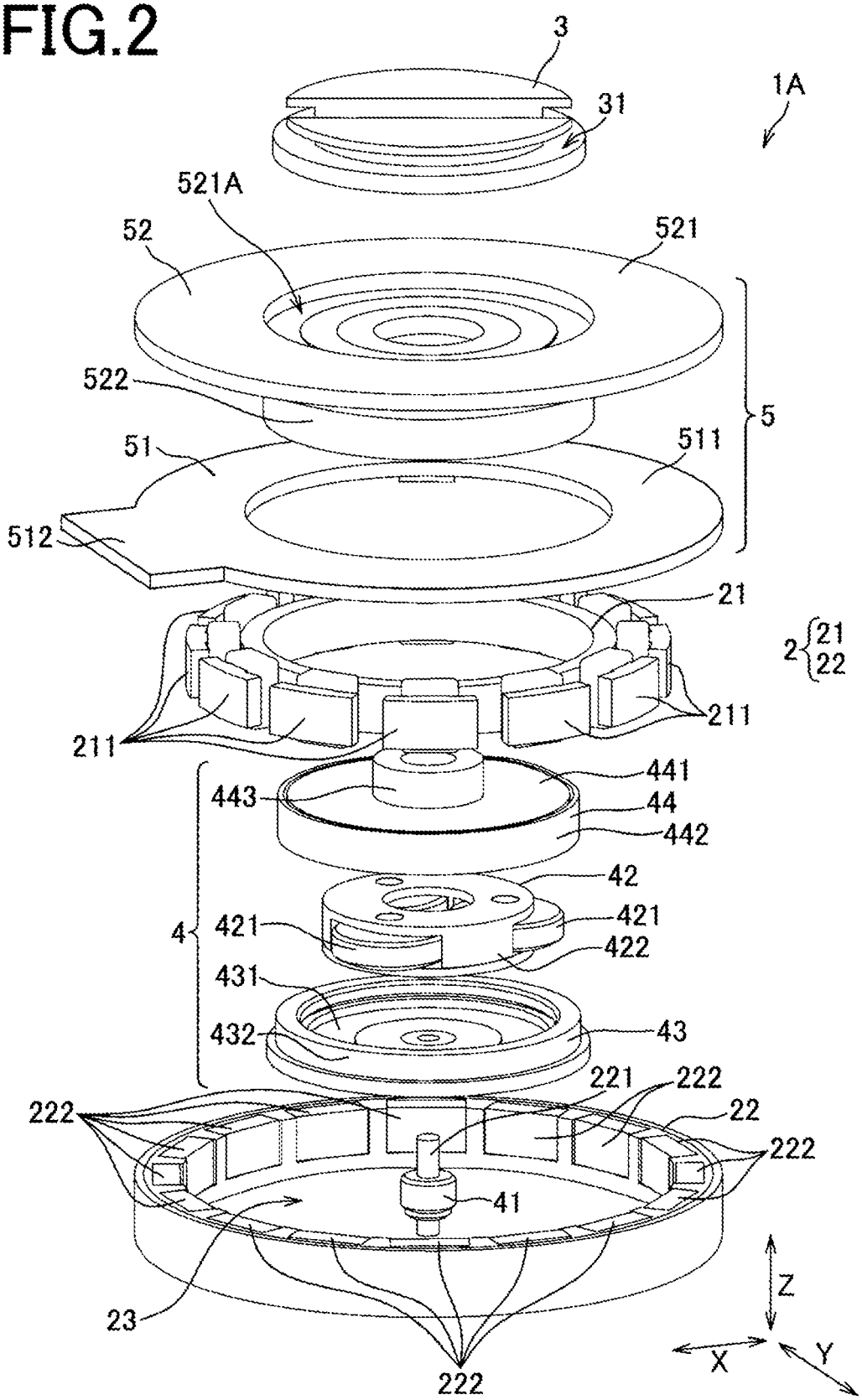
FIG. 2 is an exploded perspective view of the winding device according to the first embodiment of the present invention.
Figure 3:
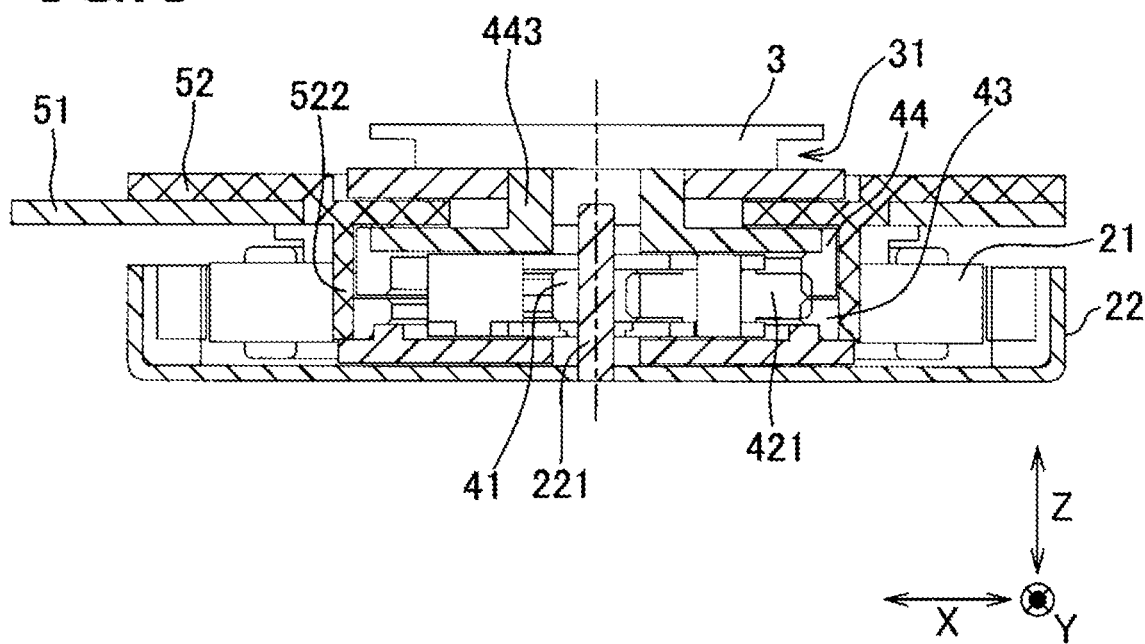
FIG. 3 is a sectional view of the winding device according to the first embodiment of the present invention.

A winding device 1A of the first embodiment includes, as illustrated in FIGS. 1 to 3, a flat motor 2, a spool 3 as a winding member, a magical planetary gear mechanism 4 as a deceleration mechanism, and a base 5. The winding device 1A is, for example, built in a shoe sole, and is configured to wind up a shoe strap or a strap-shaped member connected to the shoe strap as an elongated member. Note that in the present embodiment, an axial direction of the flat motor 2 is taken as a Z-direction, and two directions substantially perpendicular to the Z-direction are an X-direction and a Y-direction. Moreover, regarding upper and lower sides in the Z-direction, FIG. 1 is taken as a reference.

The flat motor 2 has a stator 21 and a rotor 22, and the entirety of the flat motor 2 extends in a flat shape along an XY plane and is formed in a discoid shape. The stator 21 is formed in an annular shape, and is unrotatably fixed to an outer peripheral surface of a later-described cylindrical ring 522 of the base 5. The stator 21 has multiple (12 spots in the present embodiment) teeth 211 arranged in a circumferential direction. A coil wire is wound around the teeth 211 to form a coil. This coil is connected to a not-shown power source.

The rotor 22 is formed in a bottomed cylindrical shape opening upward, and has an output shaft 221 protruding from the substantially center of a bottom surface toward the same side as the cylinder and multiple magnets 222 provided at the cylinder. The multiple (16 in an example of the present embodiment) magnets 222 are arranged along the circumferential direction. A tip end of the output shaft 221 is rotatably supported on a later-described base frame 52 of the base 5.

The stator 21 is housed inside the cylinder of the rotor 22 with the teeth 211 facing the magnets 222. An inner peripheral surface of the stator 21 housed inside the cylinder of the rotor 22 is apart from the output shaft 221, and a space (a housing 23) is formed between the output shaft 221 and each of the teeth 211 and the magnets 222.

The spool 3 is formed in a flat discoid shape along the XY plane. Moreover, a groove 31 is formed at the outer periphery of the spool 3, and the spool 3 rotates in a forward direction to wind up the elongated member around the groove 31. The spool 3 is, at a lower surface thereof, fixed to a later-described output internal gear 44 of the magical planetary gear mechanism 4, and rotates together with the output internal gear 44. In this state, a rotary shaft of the spool 3 is along the Z-direction, and is provided coaxially with a rotary shaft of the output internal gear 44. Moreover, a lower half of the spool 3 is housed in a later-described housing groove 521A of the base frame 52 such that the groove 31 is exposed.

The magical planetary gear mechanism 4 has a sun gear 41, a planetary gear unit 42, a fixed internal gear 43, and the output internal gear 44, and the entirety of the magical planetary gear mechanism 4 is formed in a discoid shape along the XY plane.

The sun gear 41 is provided at the output shaft 221 of the flat motor 2. By rotation of the rotor 22 of the flat motor 2, the sun gear 41 rotates accordingly.

The planetary gear unit 42 has multiple (three in the present embodiment) planetary gears 421 arranged at the periphery of the sun gear 41, and a case 422 rotatably supporting the planetary gears 421. The planetary gears 421 engage with the sun gear 41, the fixed internal gear 43, and the output internal gear 44.

The fixed internal gear 43 has a bottom portion 431 on which the planetary gear unit 42 is placed and a cylindrical ring 432 provided with a gear at an inner peripheral surface, and is formed in a bottomed cylindrical ring shape opening upward. The output shaft 221 and the sun gear 41 are inserted into the bottom portion 431. Moreover, an upper edge of the cylindrical ring 432 is fixed to the later-described cylindrical ring 522 of the base 5, and therefore, the fixed internal gear 43 is unrotatable relative to the base 5. A substantially lower half of the planetary gear unit 42 is housed in the fixed internal gear 43, and the gear of the cylindrical ring 432 engages with lower portions of the planetary gears 421.

The output internal gear 44 has a bottom portion 441 facing the bottom portion 431 of the fixed internal gear 43 and a cylindrical ring 442 provided with a gear at an inner peripheral surface, and is formed in a bottomed cylindrical ring shape opening downward. An output shaft 443 provided coaxially with the output shaft 221 of the flat motor 2 protrudes from an upper surface (a side opposite to the cylindrical ring 442) of the bottom portion 441, and is fixed to the spool 3. A substantially upper half of the planetary gear unit 42 is housed in the output internal gear 44, and the gear of the cylindrical ring 442 engages with upper portions of the planetary gears 421. The output internal gear 44 is provided rotatably relative to the base 5.

The number of teeth of the fixed internal gear 43 and the number of teeth of the output internal gear 44 are different from each other. Moreover, each planetary gear 421 has a certain number of teeth across the entirety in the axial direction. Thus, a gear ratio between the planetary gear 421 and the fixed internal gear 43 is different from a gear ratio between the planetary gear 421 and the output internal gear 44.

The magical planetary gear mechanism 4 described above is housed in the housing 23 of the flat motor 2 when the winding device 1A is assembled. That is, the sun gear 41, the planetary gear unit 42, the fixed internal gear 43, and the output internal gear 44 are arranged in this order in a radial direction. Moreover, the sun gear 41, the planetary gear unit 42, the fixed internal gear 43, and the output internal gear 44 are arranged between the output shaft 221 and each of the teeth 211 and the magnets 222, and are housed in the housing 23.

The base 5 has a substrate 51 and the base frame 52. The substrate 51 has an annular substrate body 511 and a support target portion 512 protruding from the substrate body 511 toward an outer peripheral side. The support target portion 512 is supported on a fixing target of the winding device 1A.

The base frame 52 has a plate-shaped portion 521 stacked on an upper side of the substrate body 511, and the cylindrical ring 522 protruding downward from the plate-shaped portion 521 and inserted into the substrate body 511. The housing groove 521A for rotatably housing the spool 3 is formed at an upper surface of the plate-shaped portion 521. The planetary gear unit 42 and the output internal gear 44 are housed inside the cylindrical ring 522.

The above-described winding device 1A operates as follows. Power is supplied to the coil wound around the teeth 211 of the flat motor 2. Accordingly, the rotor 22 rotates due to electromagnetic action, and the sun gear 41 rotates together with the output shaft 221. Thus, while rotating, the planetary gears 421 revolve around the sun gear 41. In this state, the output internal gear 44 engaging with the planetary gears 421 rotates about the output shaft 443, the Z-direction being taken as the axial direction. The rotation speed of the output internal gear 44 is determined by a relationship between the number of teeth of the fixed internal gear 43 and the number of teeth of the output internal gear 44. By rotation of the output internal gear 44, the spool 3 also rotates to wind up the elongated member.

The magical planetary gear mechanism 4 described above has a rotary shaft (the output shaft 221 of the flat motor 2) of the sun gear 41 as an input-side rotary shaft, and has the output shaft 443 of the output internal gear 44 as an output-side rotary shaft. Any of these shafts is provided coaxially with the output shaft 221 of the flat motor 2. Moreover, the spool 3 fixed to the output shaft 443 of the output internal gear 44 is also provided coaxially with the output shaft 221 of the flat motor 2.

In a case where an attempt is made to rotate the spool 3 fixed to the output internal gear 44 not by a flat motor 2 side but by external force, self-locking is caused to restrict rotation of the spool 3. That is, the magical planetary gear mechanism 4 functions as a backstop mechanism. In this state, for rotating the spool 3, the planetary gears 421 need to revolve and rotate as in the case of rotation from the flat motor 2 side, but self-locking is caused because the planetary gears 421 attempt to rotate in a rotation direction opposite to that in a normal situation. Note that in any of cases where an attempt is made to rotate the spool 3 in the forward direction and to rotate the spool 3 in a backward direction by external force, rotation of the spool 3 is restricted. Moreover, even in the case of rotating the flat motor 2 in any direction, the spool 3 rotates.

According to the present embodiment described above, the following advantageous effects are provided. That is, the flat motor 2 is used as a motor, and the spool 3 and the magical planetary gear mechanism 4 are formed flat along the XY plane as in the flat motor 2. Thus, the entirety of the device can be configured flat, and can be thinned. Moreover, rotation of the spool 3 in the backward direction by external force is prevented by the magical planetary gear mechanism 4, and therefore, looseness of the elongated member can be reduced. Further, rotation of the spool 3 in the forward direction by external force is prevented so that excessive tightening of the elongated member can be reduced.

In addition, the magical planetary gear mechanism 4 as the deceleration mechanism also functions as the backstop mechanism, and therefore, the entirety of the device can be simplified as compared to a configuration in which a deceleration mechanism and a backstop mechanism are separately provided.

Moreover, the planetary gear unit 42, the fixed internal gear 43, and the output internal gear 44 of the magical planetary gear mechanism 4 are housed in the housing 23 of the flat motor 2. Thus, the stator 21 including the teeth 211 with the coil and the rotor 22 including the magnets 222 can be increased in diameter, and therefore, higher output of the flat motor 2 can be realized. Moreover, the space between the output shaft 221 and the inside of the stator 21 is effectively utilized so that space saving can be realized. Further, the sun gear 41 is provided at the output shaft 221 of the flat motor 2 so that the configuration can be simplified without the need for providing a transmission member configured to transmit drive force from the flat motor 2 to the magical planetary gear mechanism 4.

Second Embodiment

Figure 4:
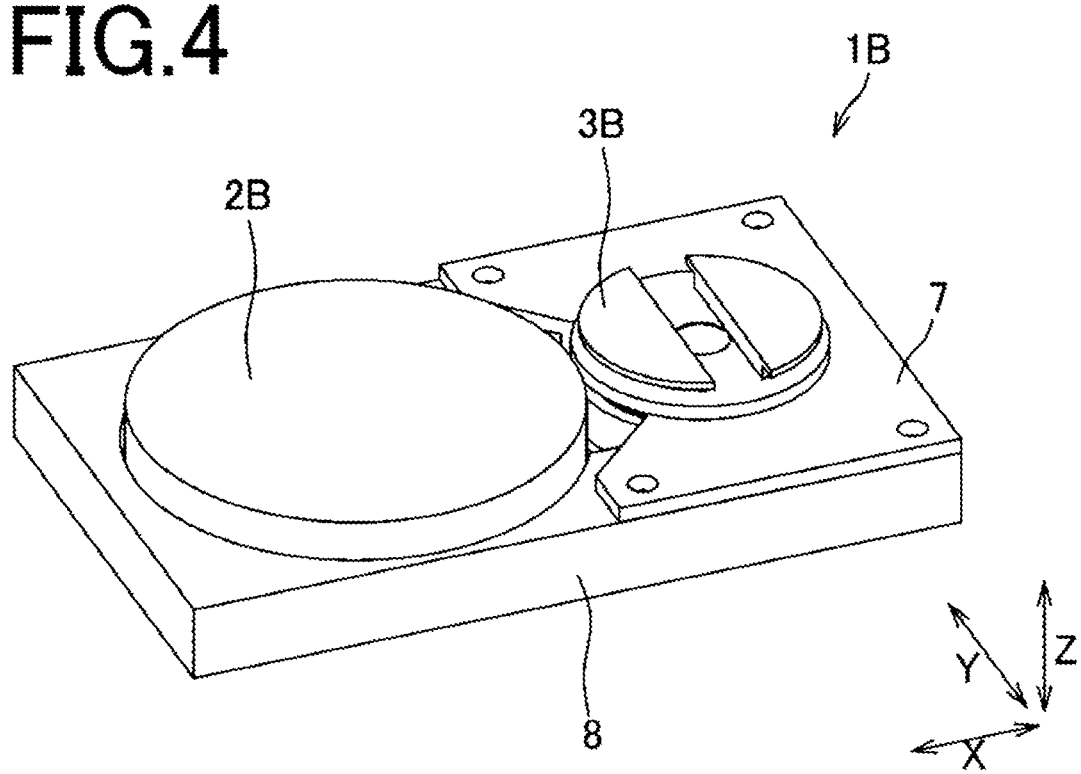
FIG. 4 is a perspective view of a winding device according to a second embodiment of the present invention.
Figure 5:
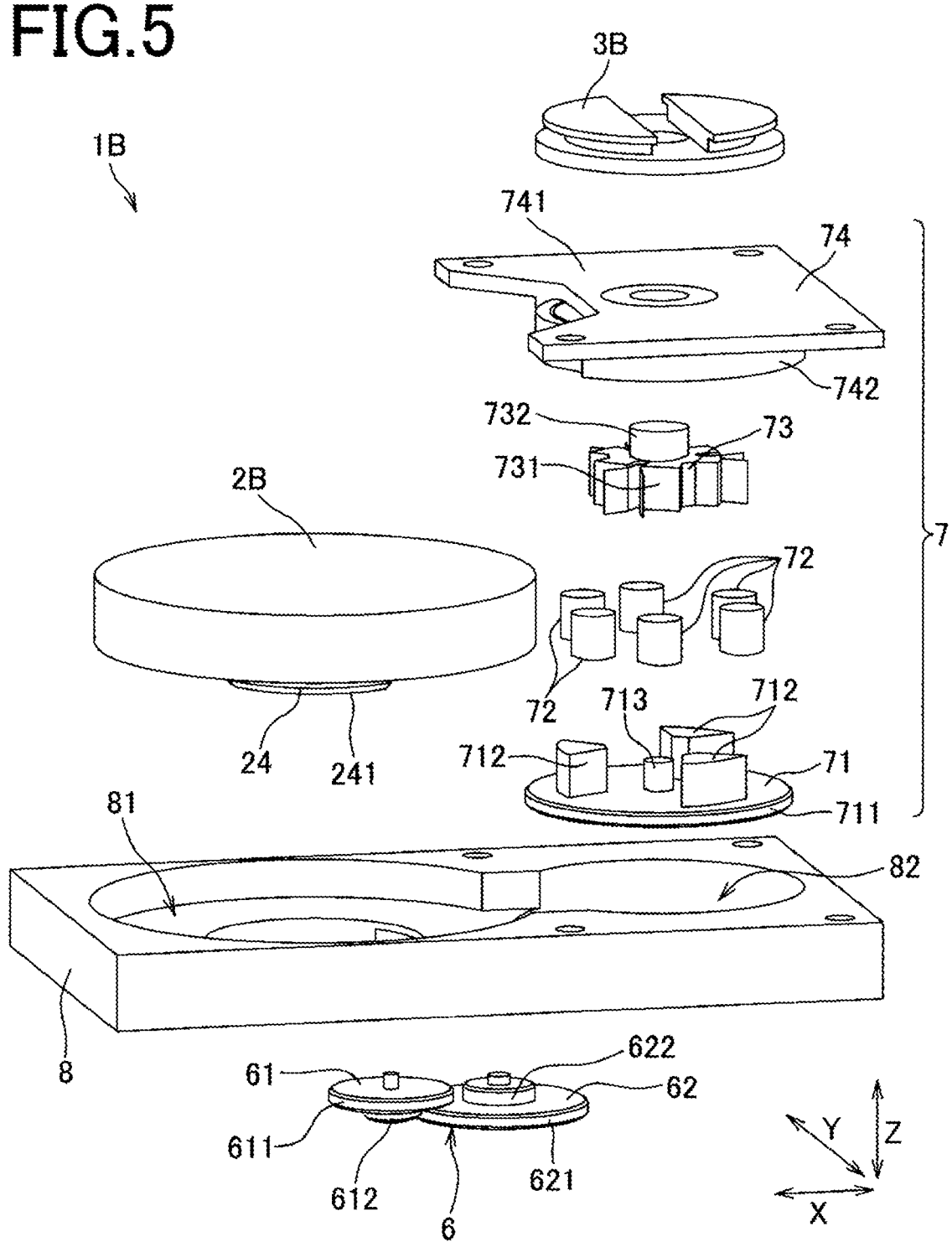
FIG. 5 is an exploded perspective view of the winding device according to the second embodiment of the present invention.

As illustrated in FIGS. 4 and 5, a winding device 1B of the second embodiment includes a flat motor 2B, a spool 3B as a winding member, a gear train 6 as a deceleration mechanism, a self-lock mechanism 7 as a backstop mechanism, and a frame 8.

The entirety of the flat motor 2B extends flat along an XY plane, and is formed in a discoid shape. The flat motor 2B is housed in the frame 8 with an output shaft 24 facing downward. An output gear 241 is provided at the output shaft 24.

The entirety of the spool 3B is formed in a discoid shape along the XY plane, and a lower surface of the spool 3B is fixed to a later-described brake output member 73 of the self-lock mechanism 7.

The gear train 6 includes a first gear 61 and a second gear 62 along the XY plane. Thus, the entirety of the gear train 6 is formed flat along the XY plane, and is housed in the frame 8. Rotary shafts of the first gear 61 and the second gear 62 are along a Z-direction, and are arranged at different positions from that of the output shaft 24 of the flat motor 2B. The first gear 61 has a large-diameter gear 611 engaging with the output gear 241 of the flat motor 2B, and a small-diameter gear 612 engaging with the second gear 62. The second gear 62 has a large-diameter gear 621 engaging with the small-diameter gear 612 of the first gear 61, and a small-diameter gear 622 engaging with a later-described brake input gear 71 of the self-lock mechanism 7. That is, the gear train 6 decelerates rotation of the flat motor 2B at a proper ratio, and transmits such rotation to the self-lock mechanism 7.

Figure 6:
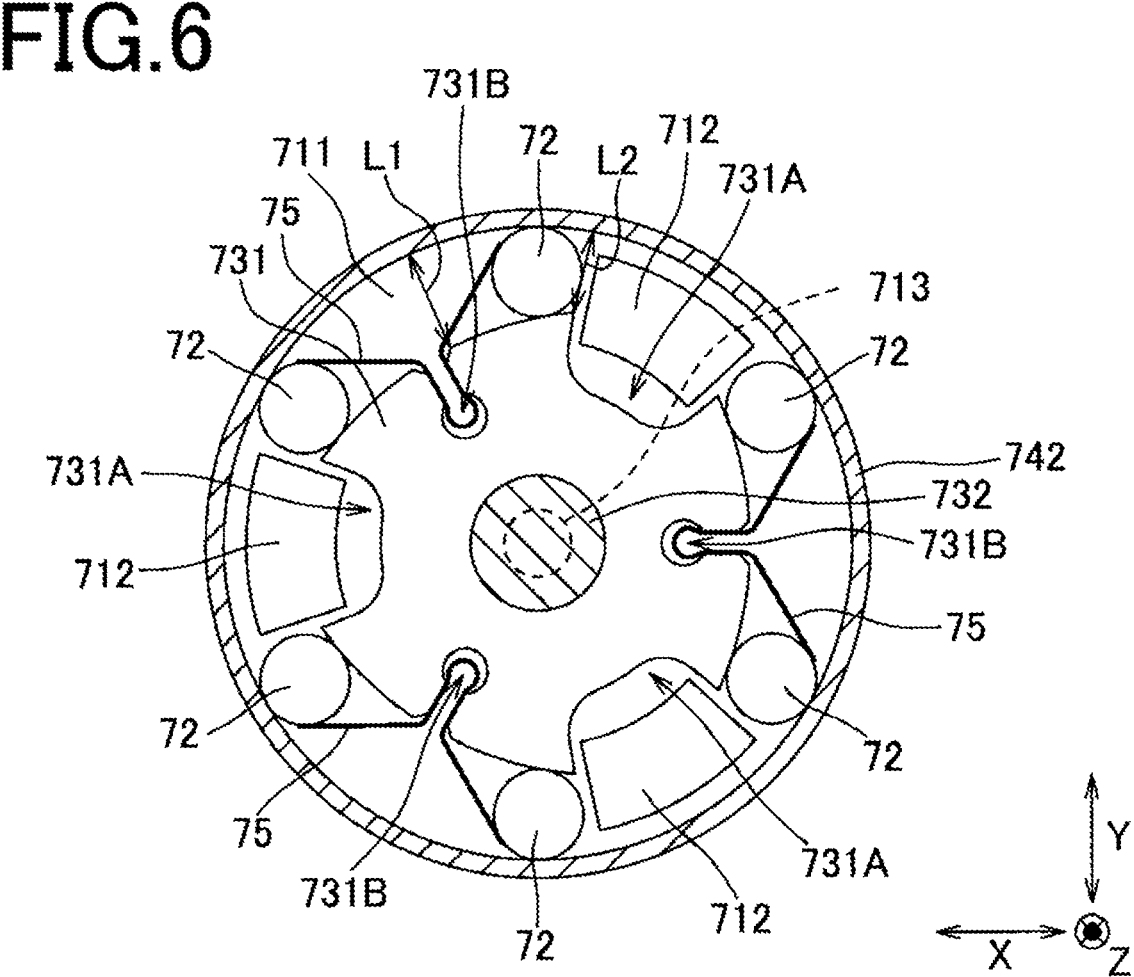
FIG. 6 is a sectional view of the winding device according to the second embodiment of the present invention.

As also illustrated in FIG. 6, the self-lock mechanism 7 has the brake input gear 71, multiple (six in the present embodiment) rollers 72, the brake output member 73, and a brake housing 74. The entirety of the self-lock mechanism 7 is formed flat along the XY plane, and is housed in the frame 8.

The brake input gear 71 has a discoid gear body 711, multiple (three in the present embodiment) power transmission protrusions 712 protruding from an upper surface of the gear body 711, and a support protrusion 713 protruding from a center portion of the upper surface of the gear body 711. The three power transmission protrusions 712 are formed in a trapezoidal shape as viewed from the Z-direction, and are arranged at substantially equal intervals in a circumferential direction.

The rollers 72 are formed in a circular columnar shape longitudinal in the Z-direction, and ones of the rollers 72 are arranged between adjacent ones of the power transmission protrusions 712. In the present embodiment, two of the rollers 72 are arranged between adjacent ones of the power transmission protrusions 712.

The brake output member 73 has a power transmission target portion 731 placed on the gear body 711 of the brake input gear 71, and an output shaft 732 protruding from an upper surface of the power transmission target portion 731. The power transmission target portion 731 has multiple (three in the present embodiment) transmission recessed portions 731A and multiple (three in the present embodiment) attachment recessed portions 731B. The power transmission target portion 731 is in such a shape that an outer peripheral surface of a circular column is cut out. A recessed portion into which the support protrusion 713 is to be inserted is formed at a lower surface of the power transmission target portion 731, and the brake output member 73 is supported on the brake input gear 71. The power transmission protrusions 712 of the brake input gear 71 are positioned at the transmission recessed portions 731A. Y-shaped lower end portions of plate springs 75 bent in a substantially Y-shape are each attached to the attachment recessed portions 731B.

The output shaft 732 extends along the Z-direction, and is fixed to the lower surface of the spool 3B with the output shaft 732 penetrating a later-described lid 741 of the brake housing 74. Thus, by rotation of the brake output member 73, the spool 3B rotates accordingly.

The brake housing 74 has the plate-shaped lid 741 along the XY plane, and a cylindrical ring 742 protruding from a lower surface of the lid. The power transmission protrusions 712, the rollers 72, and the brake output member 73 are housed inside the cylindrical ring 742.

The dimensions of each portion of the self-lock mechanism 7 and a position relationship among each portion of the self-lock mechanism 7 will be described. A clearance is formed between an outer peripheral surface (a portion not provided with the recessed portions) of the power transmission target portion 731 and an inner peripheral surface of the cylindrical ring 742, and the rollers 72 are arranged in such a clearance. The clearance between the outer peripheral surface of the power transmission target portion 731 and the inner peripheral surface of the cylindrical ring 742 is in such a gradually-narrowed wedge shape that the clearance is maximum (L1) in the vicinity of the attachment recessed portions 731B and is minimum (L2) in the vicinity of the transmission recessed portions 731A. Each plate spring 75 extends inclined with respect to a radial direction from the outer peripheral surface of the power transmission target portion 731 to the inner peripheral surface of the cylindrical ring 742, and therefore, sandwiches the roller 72 between the plate spring 75 and the outer peripheral surface of the power transmission target portion 731 and biases the roller 72 toward the transmission recessed portion 731A. When the roller 72 is positioned in contact with both of the outer peripheral surface of the power transmission target portion 731 and the inner peripheral surface of the cylindrical ring 742, part of the outer peripheral surface of the roller 72 protrudes toward the transmission recessed portion 731A to contact the power transmission protrusion 712.

In a case where an attempt is made to rotate the brake output member 73 in the self-lock mechanism 7 by external force, each roller 72 positioned in the wedge-shaped clearance is, by biasing force of the plate spring 75, positioned at such a position that the clearance is narrowest, and contacts both of the outer peripheral surface of the power transmission target portion 731 and the inner peripheral surface of the cylindrical ring 742 such that rotation of the brake output member 73 is restricted. On the other hand, in a case where an attempt is made to rotate the brake input gear 71, each power transmission protrusion 712 comes into contact with the roller 72. Thus, the roller 72 moves toward the attachment recessed portion 731B, and no longer contacts at least one of the outer peripheral surface of the power transmission target portion 731 or the inner peripheral surface of the cylindrical ring 742. Accordingly, braking is cancelled. In this state, the power transmission protrusion 712 comes into contact with the power transmission target portion 731, and therefore, rotation is transmitted to the brake output member 73.

In a case where rotation is input from a brake input gear 71 side in the self-lock mechanism 7, rotation in any direction is allowed. On the other hand, in a case where rotation is input from a brake output member 73 side, rotation in any direction is restricted. That is, in a case where an attempt is made to rotate, by external force, the spool 3B fixed to the brake output member 73, rotation in any direction is restricted.

The self-lock mechanism 7 has a rotary shaft (the support protrusion 713) of the brake input gear 71 as an input-side rotary shaft, and has the output shaft 732 of the brake output member 73 as an output-side rotary shaft. Any of these shafts extends in the Z-direction, and is provided coaxially with a rotary shaft of the spool 3. Moreover, the rotary shaft of the self-lock mechanism 7 and the rotary shaft of the spool 3B extend in parallel at positions different from that of the output shaft 24 of the flat motor 2.

The frame 8 is formed in a rectangular parallelepiped shape. On an upper side of the frame 8, a first housing recessed portion 81 for housing the flat motor 2B and a second housing recessed portion 82 for housing the self-lock mechanism 7 are formed. On a lower side of the frame 8, a third housing recessed portion for housing the gear train 6 is formed.

According to the present embodiment described above, the entirety of the device can be, as in the first embodiment, configured flat and can be thinned, and looseness of an elongated member can be reduced.

Further, use of the flat self-lock mechanism 7 can lead to thickness reduction in the entirety of the device. Moreover, the rotary shafts of the spool 3B and the self-lock mechanism 7 extend in parallel at the positions different from that of the output shaft 24 of the flat motor 2. Thus, the flat motor 2, the spool 3B, and the self-lock mechanism 7 can be arranged along the XY plane, and the entirety of the device can be thinned as compared to a configuration in which these components are all arranged coaxially.

Note that the present invention is not limited to the first embodiment and the second embodiment, and includes other configurations and the like accomplishing the object of the present invention and also includes the following modifications and the like.

For example, in the first embodiment and the second embodiment, the magical planetary gear mechanism 4 and the self-lock mechanism 7 have been described as examples of the mechanism configured to restrict rotation of the winding member at least in the backward direction by external force, but other well-known backstop mechanisms having similar functions are applicable.

Moreover, the magical planetary gear mechanism 4 and the self-lock mechanism 7 allow rotation in any direction for rotation from an input side, and restrict rotation in any direction for rotation from an output side. However, the backstop mechanism may restrict rotation of the winding member at least in the backward direction by external force. That is, the backstop mechanism may transmit, as in a ratchet mechanism, only rotation in one direction from the input side and prevent transmission of rotation in other directions, and may allow rotation in one direction from the output side and restrict rotation in other directions.

Further, in the first embodiment, the winding device 1A is provided at the shoe sole, but may be provided at other targets as long as the winding device winds up an optional elongated member. For example, the winding device may be provided at a recording device or a reproduction device of a band-shaped recording medium such as a magnetic tape to wind up the recording medium as the elongated member.

Best configurations, methods, and the like for implementing the present invention have been disclosed in description above, but the present invention is not limited to above. That is, the present invention has been mainly illustrated and described regarding specific embodiments, but those skilled in the art can make various modifications to shapes, materials, quantities, and other detailed configurations of the above-described embodiments without departing from the technical idea and object of the present invention. Thus, the description disclosed above with limited shapes, materials, and the like has been made by way of example for the sake of easy understanding of the present invention, and is not intended to limit the present invention. Thus, the present invention includes description with the names of members not having some or all of the limitations on the shapes, the materials, and the like.

LIST OF REFERENCE NUMERALS 1A, 1B winding device
2, 2B flat motor
211 teeth
221 output shaft
222 magnet
23 housing
3, 3B spool (winding member)
4 magical planetary gear mechanism (deceleration mechanism, backstop mechanism)
41 sun gear
421 planetary gear
43 fixed internal gear
44 output internal gear
7 self-lock mechanism (backstop mechanism)

The invention claimed is:

1. A winding device for winding up an elongated member, comprising:
   a flat motor placed flat along a predetermined plane;
   a winding member configured to rotate in a forward direction to wind up the elongated member;
   a deceleration mechanism provided between the flat motor and the winding member; and
   a backstop mechanism configured to restrict rotation of the winding member at least in a backward direction by external force,
   wherein the winding member and the deceleration mechanism are formed flat along the predetermined plane, and have rotary axes provided coaxially with an output shaft of the flat motor,
   the deceleration mechanism is a planetary gear mechanism having a sun gear, a planetary gear, a fixed internal gear, and an output internal gear, and
   a gear ratio between the planetary gear and the fixed internal gear is different from a gear ratio between the planetary gear and the output internal gear such that the deceleration mechanism also functions as the backstop mechanism.

2. The winding device according to claim 1, wherein
   the flat motor has a stator, a housing is configured between the output shaft and an inside of the stator to house the planetary gear, the fixed internal gear, and the output internal gear, and
   the sun gear is provided at the output shaft.

* * * * *